US012581324B2

(12) United States Patent
Zhao et al.

(10) Patent No.:  US 12,581,324 B2
(45) Date of Patent:      Mar. 17, 2026

(54) COMMUNICATION METHODS, TERMINAL DEVICE, ACCESS NETWORK DEVICE, AND CORE NETWORK DEVICE

(71) Applicant: QUECTEL WIRELESS SOLUTIONS CO., LTD., Shanghai (CN)

(72) Inventors: Zheng Zhao, Shanghai (CN); Ling Lyu, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 19/020,666

(22) Filed: Jan. 14, 2025

(65) Prior Publication Data

US 2025/0150861 A1      May 8, 2025

Related U.S. Application Data

(63) Continuation of application No. PCT/CN2023/087153, filed on Apr. 7, 2023.

(51) Int. Cl.
*H04W 24/10* (2009.01)
*H04L 5/00* (2006.01)
*H04W 24/02* (2009.01)
*H04W 36/08* (2009.01)
*H04W 64/00* (2009.01)

(52) U.S. Cl.
CPC ........... *H04W 24/02* (2013.01); *H04L 5/0051* (2013.01); *H04W 24/10* (2013.01); *H04W 36/08* (2013.01); *H04W 64/00* (2013.01)

(58) Field of Classification Search
CPC ..... H04W 24/02; H04W 24/10; H04W 36/08; H04W 64/00; H04L 5/0051
See application file for complete search history.

(56) References Cited

U.S. PATENT DOCUMENTS

2023/0413139 A1 * 12/2023 Xu ......................... H04L 5/0094
2025/0151019 A1 * 5/2025 Li ......................... H04L 5/0094

FOREIGN PATENT DOCUMENTS

| CN | 114697993 A | 7/2022 |
| CN | 115706923 A | 2/2023 |
| CN | 115804204 A | 3/2023 |
| CN | 115843076 A | 3/2023 |
| WO | WO 2023040822 A1 | 3/2023 |

OTHER PUBLICATIONS

Intel Corporation, "Capture RAN1 positioning related capabilities," 3GPP TSG-RAN WG2 Meeting #111 electronic, R2-2006950, Elbonia, Aug. 17-28, 2020, 20 pages.
International Search Report and Written Opinion in International Appln. No. PCT/CN2023/087153, mailed on Nov. 21, 2023, 8 pages (with partial English translation).

* cited by examiner

*Primary Examiner* — Chuong A Ngo
(74) *Attorney, Agent, or Firm* — Fish & Richardson P.C.

(57) ABSTRACT

A communication method, a terminal device, an access network device, and a core network device are provided. One example method includes: receiving, by a terminal device, first configuration information. The first configuration information is related to a first region and a first signal, the first signal is configured for positioning, and the first region includes a plurality of cells.

18 Claims, 3 Drawing Sheets

100

| terminal device | first access network device | second access network device | core network device |

S302 determine first configuration information

S310 first configuration information

S321 measurement request

S322 measurement request

S320

S331 SRS

S332 SRS

S333 measurement result

S334 measurement result

S330

S340 the terminal device undergoes cell reselection and resides in a cell corresponding to the second access network device S351 measurement request

S350

S361 SRS

S362 measurement result

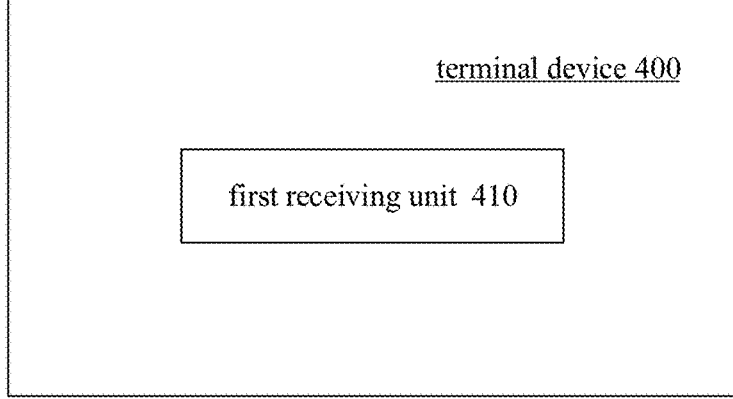

terminal device 400 first receiving unit 410

FIG. 4

COMMUNICATION METHODS, TERMINAL DEVICE, ACCESS NETWORK DEVICE, AND CORE NETWORK DEVICE

CROSS-REFERENCE TO RELATED APPLICATIONS

This application is a continuation of International Application No. PCT/CN2023/087153, filed on Apr. 7, 2023, the disclosure of which is hereby incorporated by reference in its entirety.

TECHNICAL FIELD

The various embodiments described in this document relate in general to the technical field of communication, and more specifically to communication methods, a terminal device, an access network device, and a core network device.

BACKGROUND

In the related technologies, there are many problems in uplink positioning. When cell reselection occurs at a terminal device or validity criterion fails, transmission of a first signal for positioning is stopped and a configuration of the first signal is released, which may result in positioning interruption. The first signal may include, for example, a sounding reference signal for positioning (SRS-Pos). If positioning is still required, the terminal device needs to reconnect to the network, so that the network can provide the terminal device with a new configuration of the first signal, which may result in additional power consumption and signaling overhead.

SUMMARY

Embodiments of the disclosure provide communication methods, a terminal device, an access network device, and a core network device. The following describes the various aspects of the disclosure.

According to a first aspect, a communication method is provided. The method includes: receiving, by a terminal device, first configuration information. The first configuration information is related to a first region and a first signal, the first signal is configured for positioning, and the first region includes a plurality of cells. The first configuration information is configured to indicate information for configuring the first signal, in response to the terminal device being resided in any cell of the plurality of cells in the first region.

In some embodiments, the plurality of cells include a first cell and a second cell, and the information for configuring the first signal is the same in response to the terminal device being resided in the first cell or the second cell.

In some embodiments, the plurality of cells include a first cell and a second cell, and the method further includes: receiving, by the terminal device, first indication information. The first indication information is configured to indicate whether the information for configuring the first signal is the same in response to the terminal device being resided in the first cell or the second cell.

In some embodiments, the first configuration information includes information common to the plurality of cells.

In some embodiments, the plurality of cells include a first cell, and the first configuration information includes exclusive information specific to the first cell.

In some embodiments, the exclusive information includes identification information of the first cell.

In some embodiments, the identification information of the first cell is included in an identification of a cell group, and the cell group includes at least one cell of the plurality of cells. The exclusive information includes the identification of the cell group, and the exclusive information is specific to the at least one cell of the plurality of cells.

In some embodiments, the exclusive information is related to one or more pieces of following information: a time for transmitting the first signal, a frequency at which the first signal is transmitted, and a positional relationship between the terminal device and an access network device.

In some embodiments, the first configuration information is determined by a core network device.

In some embodiments, the core network device includes a location server.

In some embodiments, the first configuration information is configured to indicate a plurality of pieces of candidate configuration information, and each of the plurality of pieces of candidate configuration information is used to configure the first signal.

In some embodiments, the method further includes: selecting, by the terminal device, one piece of candidate configuration information from the plurality of pieces of candidate configuration information as the information for configuring the first signal.

In some embodiments, the first signal is a sounding reference signal (SRS) for positioning.

In some embodiments, the first configuration information is used to configure a transmission resource of the first signal.

According to a second aspect, a communication method is provided and includes: transmitting, by an access network device, first configuration information to a terminal device. The first configuration information is related to a first region and a first signal, the first signal is configured for positioning, and the first region includes a plurality of cells. The first configuration information is configured to indicate information for configuring the first signal, in response to the terminal device being resided in any cell of the plurality of cells in the first region.

In some embodiments, the plurality of cells include a first cell and a second cell, and the information for configuring the first signal is the same in response to the terminal device being resided in the first cell or the second cell.

In some embodiments, the plurality of cells include a first cell and a second cell, the method further includes: transmitting, by the access network device, first indication information to the terminal device. The first indication information is configured to indicate whether the information for configuring the first signal is the same in response to the terminal device being resided in the first cell or the second cell.

In some embodiments, the first configuration information includes information common to the plurality of cells.

In some embodiments, the plurality of cells include a first cell, and the first configuration information includes exclusive information specific to the first cell.

In some embodiments, the exclusive information includes identification information of the first cell.

In some embodiments, the identification information of the first cell is included in an identification of a cell group, and the cell group includes at least one cell of the plurality of cells. The exclusive information includes the identification of the cell group, and the exclusive information is specific to the at least one cell of the plurality of cells.

In some embodiments, the exclusive information is related to one or more pieces of following information: a time for transmitting the first signal, a frequency at which the first signal is transmitted, and a positional relationship between the terminal device and the access network device.

In some embodiments, the first configuration information is configured to indicate a plurality of pieces of candidate configuration information, and each of the plurality of pieces of candidate configuration information is used to configure the first signal.

In some embodiments, the first configuration information is determined by a core network device.

In some embodiments, the method further includes: transmitting, by the access network device, second indication information to a core network device on condition that the terminal device undergoes cell reselection in the first region. The second indication information is configured to indicate a cell in which the terminal device resides after the cell reselection occurs.

In some embodiments, the second indication information is determined based on following information of the first signal: a timing advance (TA) estimation result, a sequence, a time-frequency position.

In some embodiments, the plurality of cells include a first cell and a second cell, the first cell is a cell in which the terminal device resides before the cell reselection. In the first cell, a time-frequency sequence of the first signal is defined as $s_1$, and in the second cell, a time-frequency sequence of the first signal is defined as $s_2$. Both $s_1$ and $s_2$ are determined based on configuration information. A sequence of the first signal received by the access network device is defined as r, and the second cell is regarded as a cell in which the terminal device resides after the cell reselection on condition that $$s_2 \odot r > s_1 \odot r$$

is satisfied.

In some embodiments, a cell in which the terminal device resides before the cell reselection occurs is a third cell, a cell in which the terminal device resides after the cell reselection occurs is a fourth cell, and the access network device is an access network device corresponding to the third cell or the fourth cell.

In some embodiments, the core network device includes a location server.

In some embodiments, the method further includes: receiving, by the access network device, third indication information. The third indication information is configured to indicate information that has been used to configure the first signal.

In some embodiments, the first signal is a sounding reference signal (SRS) for positioning.

In some embodiments, the first configuration information is used to configure a transmission resource of the first signal.

According to a third aspect, a communication method is provided and includes: determining, by a core network device, first configuration information for a terminal device. The first configuration information is related to a first region and a first signal, the first signal is configured for positioning, and the first region includes a plurality of cells. The first configuration information is configured to indicate information for configuring the first signal, in response to the terminal device being resided in any cell of the plurality of cells in the first region.

In some embodiments, the plurality of cells include a first cell and a second cell, and the information for configuring the first signal is the same in response to the terminal device being resided in the first cell or the second cell.

In some embodiments, the first configuration information includes information common to the plurality of cells.

In some embodiments, the plurality of cells include a first cell, and the first configuration information includes exclusive information specific to the first cell.

In some embodiments, the exclusive information includes identification information of the first cell.

In some embodiments, the identification information of the first cell is included in an identification of a cell group, and the cell group includes at least one cell of the plurality of cells. The exclusive information includes the identification of the cell group, and the exclusive information is specific to the at least one cell of the plurality of cells.

In some embodiments, the exclusive information is related to one or more pieces of following information: a time for transmitting the first signal, a frequency at which the first signal is transmitted, and a positional relationship between the terminal device and the access network device.

In some embodiments, the first configuration information is configured to indicate a plurality of pieces of candidate configuration information, and each of the plurality of pieces of candidate configuration information is used to configure the first signal.

In some embodiments, the method further includes: receiving, by the core network device, second indication information transmitted by an access network device on condition that the terminal device undergoes cell reselection in the first region. The second indication information is configured to indicate a cell in which the terminal device resides after the cell reselection occurs.

In some embodiments, the second indication information is determined based on following information of the first signal: a timing advance (TA) estimation result, a sequence, and a time-frequency position.

In some embodiments, the plurality of cells include a first cell and a second cell, the first cell is a cell in which the terminal device resides before the cell reselection. In the first cell, a time-frequency sequence of the first signal is defined as $s_1$, and in the second cell, a time-frequency sequence of the first signal is defined as $s_2$. Both $s_1$ and $s_2$ are determined based on configuration information. A sequence of the first signal received by the access network device is defined as r, and the second cell is regarded as a cell in which the terminal device resides after the cell reselection on condition that $$s_2 \odot r > s_1 \odot r$$

is satisfied.

In some embodiments, a cell in which the terminal device resides before the cell reselection occurs is a third cell, a cell in which the terminal device resides after the cell reselection occurs is a fourth cell, and the access network device is an access network device corresponding to the third cell or the fourth cell.

In some embodiments, the method further includes: transmitting, by the core network device, third indication information to an access network device. The third indication information is configured to indicate information that has been used to configure the first signal.

In some embodiments, the first signal is a sounding reference signal (SRS) for positioning.

In some embodiments, the first configuration information is used to configure a transmission resource of the first signal.

In some embodiments, the core network device includes a location server.

According to a fourth aspect, a terminal device is provided and includes a first receiving unit configured to receive first configuration information. The first configuration information is related to a first region and a first signal, the first signal is configured for positioning, and the first region includes a plurality of cells. The first configuration information is configured to indicate information for configuring the first signal, in response to the terminal device being resided in any cell of the plurality of cells in the first region.

In some embodiments, the plurality of cells include a first cell and a second cell, and the information for configuring the first signal is the same in response to the terminal device being resided in the first cell or the second cell.

In some embodiments, the plurality of cells include a first cell and a second cell, and the terminal device further includes: a second receiving unit configured to receive first indication information. The first indication information is configured to indicate whether the information for configuring the first signal is the same in response to the terminal device being resided in the first cell or the second cell.

In some embodiments, the first configuration information includes information common to the plurality of cells.

In some embodiments, the plurality of cells include a first cell, and the first configuration information includes exclusive information specific to the first cell.

In some embodiments, the exclusive information includes identification information of the first cell.

In some embodiments, the identification information of the first cell is included in an identification of a cell group, and the cell group includes at least one cell of the plurality of cells. The exclusive information includes the identification of the cell group, and the exclusive information is specific to the at least one cell of the plurality of cells.

In some embodiments, the exclusive information is related to one or more pieces of following information: a time for transmitting the first signal, a frequency at which the first signal is transmitted, and a positional relationship between the terminal device and an access network device.

In some embodiments, the first configuration information is determined by a core network device.

In some embodiments, the core network device includes a location server.

In some embodiments, the first configuration information is configured to indicate a plurality of pieces of candidate configuration information, and each of the plurality of pieces of candidate configuration information is used to configure the first signal.

In some embodiments, the terminal device further includes: a selecting unit configured to select one piece of candidate configuration information of the plurality of pieces of candidate configuration information as the information for configuring the first signal.

In some embodiments, the first signal is a sounding reference signal (SRS) for positioning.

In some embodiments, the first configuration information is used to configure a transmission resource of the first signal.

According to a fifth aspect, an access network device is provided and includes: a first transmitting unit configured to transmit first configuration information to a terminal device. The first configuration information is related to a first region and a first signal, the first signal is configured for positioning, and the first region includes a plurality of cells. The first configuration information is configured to indicate information for configuring the first signal, in response to the terminal device being resided in any cell of the plurality of cells in the first region.

In some embodiments, the plurality of cells include a first cell and a second cell, and the information for configuring the first signal is the same in response to the terminal device being resided in the first cell or the second cell.

In some embodiments, the plurality of cells include a first cell and a second cell, the access network device further includes: a second transmitting unit configured to transmit first indication information to the terminal device. The first indication information is configured to indicate whether the information for configuring the first signal is the same in response to the terminal device being resided in the first cell or the second cell.

In some embodiments, the first configuration information includes information common to the plurality of cells.

In some embodiments, the plurality of cells include a first cell, and the first configuration information includes exclusive information specific to the first cell.

In some embodiments, the exclusive information includes identification information of the first cell.

In some embodiments, the identification information of the first cell is included in an identification of a cell group, and the cell group includes at least one cell of the plurality of cells. The exclusive information includes the identification of the cell group, and the exclusive information is specific to the at least one cell of the plurality of cells.

In some embodiments, the exclusive information is related to one or more pieces of following information: a time for transmitting the first signal, a frequency at which the first signal is transmitted, and a positional relationship between the terminal device and the access network device.

In some embodiments, the first configuration information is configured to indicate a plurality of pieces of candidate configuration information, and each of the plurality of pieces of candidate configuration information is used to configure the first signal.

In some embodiments, the first configuration information is determined by a core network device.

In some embodiments, the access network device further includes: a third transmitting unit configured to transmit second indication information to a core network device on condition that the terminal device undergoes cell reselection in the first region. The second indication information is configured to indicate a cell in which the terminal device resides after the cell reselection occurs.

In some embodiments, the second indication information is determined based on following information of the first signal: a timing advance (TA) estimation result, a sequence, a time-frequency position.

In some embodiments, the plurality of cells include a first cell and a second cell, the first cell is a cell in which the terminal device resides before the cell reselection. In the first cell, a time-frequency sequence of the first signal is defined as $s_1$, and in the second cell, a time-frequency sequence of the first signal is defined as $s_2$. Both $s_1$ and $s_2$ are determined based on configuration information. A sequence of the first signal received by the access network device is defined as r, and the second cell is regarded as a cell in which the terminal device resides after the cell reselection on condition that $$s_2 \; \text{\textcircled{$\cdot$}} \; r > s_1 \; \text{\textcircled{$\cdot$}} \; r$$

is satisfied.

In some embodiments, a cell in which the terminal device resides before the cell reselection occurs is a third cell, a cell in which the terminal device resides after the cell reselection occurs is a fourth cell, and the access network device is an access network device corresponding to the third cell or the fourth cell.

In some embodiments, the core network device includes a location server.

In some embodiments, the access network device further includes: a fourth receiving unit configured to receive third indication information. The third indication information is configured to indicate information that has been used to configure the first signal.

In some embodiments, the first signal is a sounding reference signal (SRS) for positioning.

In some embodiments, the first configuration information is used to configure a transmission resource of the first signal.

According to a sixth aspect, a core network device is provided and includes: a determining unit configured to determine first configuration information for a terminal device. The first configuration information is related to a first region and a first signal, the first signal is configured for positioning, and the first region includes a plurality of cells. The first configuration information is configured to indicate information for configuring the first signal, in response to the terminal device being resided in any cell of the plurality of cells in the first region.

In some embodiments, the plurality of cells include a first cell and a second cell, and the information for configuring the first signal is the same in response to the terminal device being resided in the first cell or the second cell.

In some embodiments, the first configuration information includes information common to the plurality of cells.

In some embodiments, the plurality of cells include a first cell, and the first configuration information includes exclusive information specific to the first cell.

In some embodiments, the exclusive information includes identification information of the first cell.

In some embodiments, the identification information of the first cell is included in an identification of a cell group, and the cell group includes at least one cell of the plurality of cells. The exclusive information includes the identification of the cell group, and the exclusive information is specific to the at least one cell of the plurality of cells.

In some embodiments, the exclusive information is related to one or more pieces of following information: a time for transmitting the first signal, a frequency at which the first signal is transmitted, and a positional relationship between the terminal device and the access network device.

In some embodiments, the first configuration information is configured to indicate a plurality of pieces of candidate configuration information, and each of the plurality of pieces of candidate configuration information is used to configure the first signal.

In some embodiments, the core network device further includes: a third receiving unit configured to receive second indication information transmitted by an access network device on condition that the terminal device undergoes cell reselection in the first region. The second indication information is configured to indicate a cell in which the terminal device resides after the cell reselection occurs.

In some embodiments, the second indication information is determined based on following information of the first signal: a timing advance (TA) estimation result, a sequence, and a time-frequency position.

In some embodiments, the plurality of cells include a first cell and a second cell, the first cell is a cell in which the terminal device resides before the cell reselection. In the first cell, a time-frequency sequence of the first signal is defined as $s_1$, and in the second cell, a time-frequency sequence of the first signal is defined as $s_2$. Both $s_1$ and $s_2$ are determined based on configuration information. A sequence of the first signal received by the access network device is defined as r, and the second cell is regarded as a cell in which the terminal device resides after the cell reselection on condition that $$s_2 \; \text{\textcircled{$\cdot$}} \; r > s_1 \; \text{\textcircled{$\cdot$}} \; r$$

is satisfied.

In some embodiments, a cell in which the terminal device resides before the cell reselection occurs is a third cell, a cell in which the terminal device resides after the cell reselection occurs is a fourth cell, and the access network device is an access network device corresponding to the third cell or the fourth cell.

In some embodiments, the core network device further includes: a fourth transmitting unit configured to transmit third indication information to an access network device. The third indication information is configured to indicate information that has been used to configure the first signal.

In some embodiments, the first signal is a sounding reference signal (SRS) for positioning.

In some embodiments, the first configuration information is used to configure a transmission resource of the first signal.

In some embodiments, the core network device includes a location server.

According to a seventh aspect, a terminal device is provided and includes a memory for storing at least one computer program and at least one processor for invoking the at least one computer program in the memory to cause the terminal device to perform part or all operation of the method described in the first aspect.

According to an eighth aspect, an access network device is provided and includes at least one processor, a memory for storing at least one computer program, and a transceiver. The at least one processor is configured for invoking the at least one computer program in the memory to cause the access network device to perform part or all operation of the method described in the second aspect.

According to a ninth aspect, a core network device is provided and includes at least one processor, a memory for storing at least one computer program, and a transceiver. The at least one processor is configured for invoking the at least one computer program in the memory to cause the access network device to perform part or all operation of the method described in the third aspect.

According to a tenth aspect, a communication system is provided and includes one or more items of the terminal device, the access network device, and the core network device described above. In another possible design, the system may also include other devices that interact with the terminal device or network device in the scenario provided by embodiments of the present disclosure.

According to an eleventh aspect, a computer-readable storage medium is provided and stores at least one computer program, the at least one computer program is configured to cause one or more of the terminal device, the access network device, and the core network device to perform some of or all the operations in the method of the above aspects.

According to a twelfth aspect, a computer program product is provided, where the computer program product includes a non-transitory computer-readable storage medium storing a computer program, the computer program is operable to cause one or more of the terminal device, the access network device, and the core network device to perform some or all of the operations in a method of the above aspects. In some implementations, the computer program product may be a software installation package.

According to a thirteenth aspect, a chip is provided and includes a memory and a processor for invoking and running a computer program in the memory to perform some or all of the operations in a method of the above aspects.

Based on the first configuration information, even if the cell in which the terminal device resides has changed, as long as the newly resided cell belongs to the first region, the terminal device can still transmit the first signal based on the first configuration information to achieve positioning. Therefore, in the case where the cell in which the terminal device resides has changed, the terminal device is not required to establish a connection with the network device, or is not required to perform signaling interaction with the network device to obtain configuration information of the first signal, thereby reducing signaling and power consumption overhead.

BRIEF DESCRIPTION OF THE DRAWINGS

FIG. 3 is a schematic flow chart of a communication method according to another embodiment of the present disclosure.

FIG. 4 is a schematic structural diagram of a terminal device according to an embodiment of the present disclosure.

DETAILED DESCRIPTION OF THE EMBODIMENTS

Hereinafter, technical solutions in the present disclosure will be described with reference to the accompanying drawings. In order to facilitate understanding, terms related to the present disclosure will be described below.

Communication System

Figure 1:
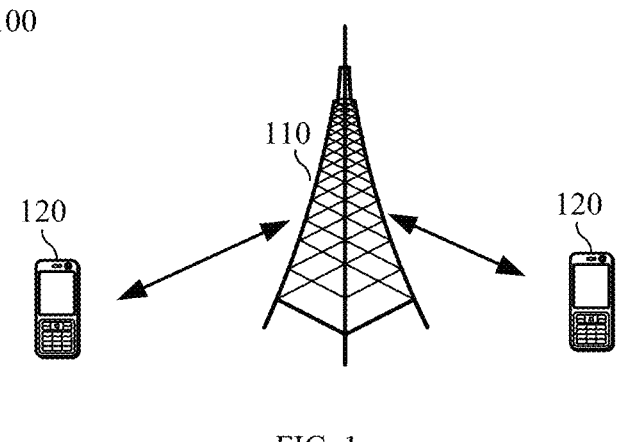
FIG. 1 is a schematic diagram of a wireless communication system to which an embodiment of the present disclosure is applied.

FIG. 1 shows a wireless communication system 100 to which an embodiment of the present disclosure is applied. The wireless communication system 100 may include a network device 110 and at least one terminal device 120. The network device 110 may be a device that communicates with each terminal device 120. The network device 110 may provide communication coverage for a particular geographic region and may communicate with the at least one terminal device 120 located within the coverage region.

FIG. 1 exemplarily illustrates one network device and two terminal devices. Alternatively, the wireless communication system 100 may include a plurality of network devices and other numbers of terminal devices may be included within a coverage range of each network device, which are not limited in the embodiment of the present disclosure.

Optionally, the wireless communication system 100 may further include other network entities such as a network controller and a mobility management entity, and the like which are not limited in embodiments of the present disclosure.

It shall be understood that the technical solutions of the embodiments of the present disclosure can be applied to various communication systems, such as a fifth generation (5G) mobile communication system or a new radio (NR) system, a long-term evolution (LTE) system, an LTE frequency division duplex (FDD) system, an LTE time division duplex (TDD) system, and the like. The technical solutions provided in the present disclosure can also be applied to future communication systems, such as a sixth generation mobile communication system, a satellite communication system, and the like.

The terminal device in the embodiment of the present disclosure may also be referred to as a user equipment (UE), an access terminal, a subscriber unit, a subscriber station, a mobile station (MS), a mobile terminal (MT), a remote station, a remote terminal, a mobile device, a user terminal, a terminal, a wireless communication device, a user agent, or a user device. The terminal device in the embodiment of the present disclosure may be a device that provides voice and/or data connectivity to a user, and may be used to connect people, objects, and machines, for example, a handheld device having a wireless connection function, a vehicle-mounted device, or the like. The terminal device in the embodiment of the present disclosure may be a mobile phone, a tablet (Pad), a notebook computer, a handheld computer, a mobile internet device (MID), a wearable device, a virtual reality (VR) device, or an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, and the like. Alternatively, the UE may be used to act as a base station. For example, a UE may act as a scheduling entity that provides side link signals between UEs in vehicle-to-everything (V2X) or device-to-device (D2D), etc. For example, cellular telephones and automobiles communicate with each other using side link signals. Communication between cellular phones and smart home devices is conducted without need of relaying communication signals through base stations.

The network device in the embodiment of the present disclosure may be a device for communicating with the terminal device. The network device may also include an access network device. The access network device may also be referred to as a radio access network device, a base station, or the like. The access network device in the embodiment of the present disclosure may refer to a radio access network (RAN) node (or device) that connects the terminal device to the wireless network. The access network devices may broadly cover, or be substituted for, various names among, a Node B (NodeB), an evolved NodeB (eNB), a next generation NodeB (gNB), a relay station, an access point, a transmitting and receiving point (TRP), a transmitting point (TP), a master eNB (MeNB), a secondary eNB (SeNB), a multi-standard radio (MSR) node, a home base station, a network controller, an access node, a wireless node, an access point (AP), a transmission node, a transceiver node, a base band unit (BBU), a remote radio unit (RRU), an active antenna unit (AAU), a remote radio head (RRH), a central unit (CU), a distributed unit (DU), a positioning node, etc. The base station may be a macro base station, a micro base station, a relay node, a donor node, or the like, or a combination thereof. The base station may also refer to a communication module, a modem, or a chip provided in the apparatus or device. The base station may also be a mobile switching center, a device that undertakes the function of a base station in D2D, V2X, or M2M communication, a network-side device in a 6G network, a device that undertakes the function of a base station in a future communication system, or the like. The base stations may support networks of the same or different access technologies. There is no restriction on the specific technology and the specific equipment adopted by the network in the embodiments of the present disclosure.

The base station may be a fixed base station or a mobile base station. For example, a helicopter or unmanned aerial vehicle may be configured to act as a mobile base station, and one or more cells may change according to the location of the mobile base station. In other examples, a helicopter or unmanned aerial vehicle may be configured to be used as a device to communicate with another base station.

In some deployments, the network device in the embodiment of the present disclosure may refer to a CU or a DU, or the network device includes a CU and a DU. The gNB may also include an AAU.

The network devices and terminal devices can be deployed on land, including indoor or outdoor, or handheld or vehicle-mounted network devices and terminal devices, or can also be deployed on the surface of the water. Alternatively, the network devices and terminal devices can also be deployed on airplanes, balloons, and satellites in the air. In the embodiment of the present disclosure, the scenario in which the network device and the terminal device are located is not limited.

The communication devices involved in the wireless communication system may include not only access network devices and terminal devices, but also include core network devices. The core network device may also be a network device.

The core network device in the embodiment of the present disclosure may include a device that processes and forwards signaling and data of a user. For example, the core network device may include a core access and mobility management function (AMF), a session management function (SMF), and core network devices such as a user plane gateway and a location server. The user plane gateway may be a server having functions such as mobility management, routing, and forwarding of user plane data, and is generally located on the network side, such as a serving gateway (SGW), a packet data network gateway (PGW), a user plane function (UPF), or the like. The AMF and the SMF may be equivalent to a mobility management entity (MME) in an LTE system. The AMF is mainly responsible for the access, and the SMF is mainly responsible for the session management. The core network may also include other network elements, which are not listed herein.

The location servers have a location function. The location server involved in the embodiments of the present disclosure may include a location management function (LMF) or a location management component (LMC), or may be a local location management function (LLMF) located in a network device, which is not limited in the embodiments of the present disclosure. In some embodiments, the location server may also be referred to as a location management device.

It shall be understood that all or part of the functionality of the communication device in the present disclosure may also be implemented by software functionality running on hardware, or by virtualization functionality instantiated on a platform, such as a cloud platform.

Positioning Technology

In some wireless communication systems, positioning of a communication device may be achieved based on positioning technologies.

The positioning technologies may include uplink positioning, downlink positioning, and uplink and downlink joint positioning. No matter which positioning technology is used, reference signals need to be used. The reference signal may be, for example, a sounding reference signal (SRS). When performing the uplink positioning, the serving cell may transmit configuration information of the SRS-Pos. The terminal device may transmit the SRS-Pos according to the configuration information of the SRS-Pos. The access network device corresponding to the serving cell or the neighbouring cell may receive the SRS-Pos. Based on the received SRS-Pos, the access network device can estimate information such as a power, a delay, or an angle, and parse/calculate the information to obtain user location information or report the user location information to the core network device (e.g., LMF). The core network device can perform location calculation according to the reported information to obtain the location information of the terminal device.

The configuration information of the SRS-Pos may be configured in a higher layer parameter "SRS-Config" and associated with a dedicated uplink bandwidth part (UL BWP) of a specific cell. The configuration information of the SRS-Pos may include, for example, information of an SRS-Pos resource set (e.g., carried in an SRS-PosResourceSet field) and information of an SRS-Pos resource (e.g., carried in an SRS-PosResource field). The information of the SRS-Pos resource set may include, for example, one or more pieces of the following information: an identification (srs-sResourceSetId) of the SRS resource set for positioning, an identification list (srs-PosResourceIdList) of SRS resources for positioning, a resource type (resourceType), an offset (including, for example, fields "alpha", "p0"), a reference RS path loss (pathlossReferenceRS-Pos). The information of the SRS-Pos resource may include, for example, one or more pieces of the following information: an identification (srs-PosResourceId) of SRS resources for positioning, configuration of transmission comb (transmissionComb), a location (resourceMapping (e.g. including fields "startPosition", "nrofSymbols")) of the SRS resources for positioning in time domain, a location (freqDomainShift) of the SRS resources for positioning in frequency domain, hopping configuration related parameters (freqHopping (c-SRS)) of the SRS resources for positioning, group hopping or sequence hopping indication (groupOrSequenceHopping), a resource type (resourceType) of the SRS resources for positioning, a sequence identification (sequenceId) for initialization, and a spatial relationship (spatialRelationInfo-Pos) between a reference RS and a target SRS.

With the development of technology, mobile devices and mobile assets are becoming more common in flexible production. Therefore, the demand for real-time location data in the production process is increasingly increased, such that positioning is particularly important for factory control applications. The factory control applications may include, for example, warehousing and logistics processes, autonomous driving systems, fleet management, and the like. Under ideal circumstances, all related goods and products can be continuously tracked from reception to an availability state of the goods and products. During tracking processes, real-time control, optimization of material flow, and relevant contextual information needed for subsequent production processes can be provided. For example, for an autonomous driving system, parts can be independently picked up from a warehouse and the parts can be transported to an assembly unit on the shop floor. As another example, as part of a flexible fleet management system, the autonomous driving systems can continuously localize, move quickly, and constantly interact with the environment. As another example, production machinery and assembly units and given status of the production machinery and assembly units can be seamlessly monitored. During monitoring, related objects such as tools and workpieces can be located, thus making it possible to quickly adapt to environmental changes, thus realizing flexible and autonomously controlled production, and being able to adapt to new situations at any time. In addition, wireless positioning based on a human-machine interface such as augmented reality (AR) or virtual reality (VR) is also possible.

In addition to the demand for positioning, power consumption has gradually become a content that needs to be paid attention to during the positioning. That is, low-power and high-precision positioning is an indispensable part of industrial applications. For low-power Internet of things (IoT) devices, the total energy required at a specific time includes energy for positioning (varies depending on the positioning method used), energy for communication/synchronization, and power consumption due to unpredictable factors taking into account additional losses, etc. The power consumption may include one or more of power consumption for safety, power management, microcontroller, battery self-discharge, and the like. Examples of target applications for the low-power high-precision positioning include at least one of asset tracking, vehicle tracking, and tool tracking in process automation.

For the low-power high-precision positioning, positioning requirements vary in different use cases. Table 1 illustrates examples of use cases having the low-power high-precision positioning requirement.

TABLE 1

| Use Case # | Vertical reliability | Corresponding Service Level (22.261) | Positioning Interval/Task Period | Battery Life/ Minimum Run Time |
|---|---|---|---|---|
| 1 | 10 m | Service Level 1 | On demand | 24 months |
| 2 | 2 m-3 m | Service Level 2 | <4 seconds | >6 months |
| 3 | <1 m | Service Level 3 | Not mentioned (no indication) | 1 work shift-8 hours (up to 3 days, 1 month when used for storing) |
| 4 | <1 m | Service Level 3 | 1 second | 6-8 years |
| 5 | <1 m | Service Level 3 | 5 seconds-15 minutes | 18 months |
| 6 | <1 m | Service Level 3 | 15 seconds-30 seconds | 6-12 months |
| 7 | 30 m | Service Level 5 | 250 ms | 18 months |
| 8 | 30 m | Service Level 5 | 1 second | 6-8 years (no limit on battery size) |
| 9 | 10 m | Service Level 1 | 20 minutes | 12 years (@ 20 mJ/ location point) |

In the related technologies, there may be situations where power consumption may be relatively high in uplink positioning. For example, for uplink positioning of a terminal device in a radio resource control (RRC) inactive state (RRC_INACTIVE), configuration information of the SRS-Pos is carried by RRC signaling (for example, RRC connection release (RRCRelease) signaling) of a serving cell (also referred to as a cell corresponding to a serving RAN node). The configuration of the SRS-Pos may be valid only when the terminal device is within the serving cell and a timing alignment timer is running. That is, when cell reselection occurs at the terminal device or validity criterion fails, transmission of the SRS-Pos is stopped and the configuration of the SRS-Pos is released. The validity criterion may be determined according to the path loss measurement. After the configuration of the SRS-Pos is released, the terminal device is not able to transmit the SRS-Pos, resulting in positioning interruption. However, in some cases, the positioning could not be interrupted, that is, the terminal device still needs to transmit the SRS-Pos after the configuration of the SRS-Pos is released. For example, in the use cases defined in TS 22.104, the terminal device is required to periodically transmit the SRS-Pos. In view of these situations, after cell reselection occurs at the terminal device, the terminal device needs to reconnect to the network, so that the LMF can re-request the configuration information of the SRS-Pos of the terminal device. In addition, the network device needs to provide a new SRS-Pos configuration to the terminal device, additional power consumption and signaling overhead may be caused. In particular, for a mobile terminal device that needs to periodically perform cell reselection, the above-described procedure may result in a large amount of power consumption and signaling overhead, making it difficult to meet the requirement of low power consumption.

Figure 2:
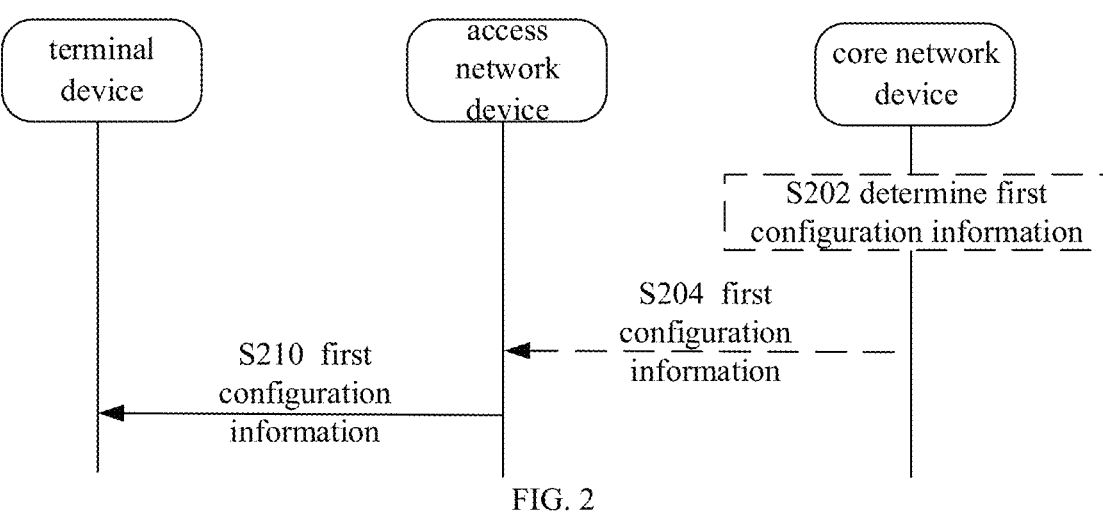
FIG. 2 is a schematic flow chart of a communication method according to an embodiment of the present disclosure.

FIG. 2 is a schematic flow chart of a communication method provided in an embodiment of the present disclosure to solve the above problems. The method shown in FIG. 2 may be performed by an access network device and a terminal device. The method shown in FIG. 2 may include operations at S210.

At S210, the terminal device receives first configuration information. Correspondingly, the access network device transmits the first configuration information.

The first configuration information is related to a first region and a first signal.

The first signal may be a signal for positioning. For example, the first signal may be the sounding reference signal (SRS) for positioning described above, i.e., the SRS-Pos.

The first region may include a plurality of cells. That is, the first configuration information may be related to the plurality of cells, or the first configuration information may be configured to configure the first signal for the plurality of cells.

When the terminal device resides in any cell of the plurality of cells in the first region, the first configuration information may be configured to indicate information for configuring the first signal. The information for configuring the first signal may be, for example, configuration information for indicating a transmission resource of the first signal. That is, the first configuration information may be configured to indicate a transmission resource of the first signal. The terminal device may transmit the first signal over the transmission resource indicated by the first configuration information. If the first signal is an SRS-Pos, the first configuration information may implement multi-cell SRS configuration, cross-cell configuration, or multi-cell SRS joint configuration. The information for configuring the first signal may include one or more of the above-described parameters "SRS-Config".

It shall be understood that when the terminal device resides in any cell in the first region, the terminal device may transmit the first signal based on the first configuration information, or the first configuration information may be configured to configure the first signal. Alternatively, for a non-currently resident cell (i.e., a cell in which the terminal device is not resided currently), the first configuration information can also be used to implement configuration of the first signal. That is, the first configuration information may implement cross-cell configuration. As one implementation, the terminal device may perform cell reselection in the first region. Before the terminal device performs the cell reselection, the terminal device may transmit a first signal based on the first configuration information. After the terminal device performs the cell reselection, that is, a cell in which the terminal device resides changes, the terminal device may still transmit the first signal based on the first configuration information.

It shall be understood that when the terminal device is in the first region, the first configuration information may be valid. That is, the first configuration information may be configured to configure the first signal for positioning. Therefore, the first region may also be referred to as a positioning effective region (or an effective region for short).

As an embodiment, the first configuration information may include information of the first region and information for configuring the first signal. The information of the first region may include, for example, information of the plurality of cells in the first region. For example, the information of the first region may include an identification (ID) of each of the plurality of cells.

It shall be understood that the terminal device may transmit the first signal based on the first configuration information in a cell in which the terminal device currently resides. If the cell in which the terminal device resides changes at a future time point, the terminal device may still determine the first signal to be transmitted based on the first configuration information. That is, the first configuration information may implement pre-configuration of the first signal. Based on the first configuration information, even if the cell in which the terminal device resides changes, as long as a cell in which the terminal device newly resides belongs to the first region, the terminal device may still transmit a first signal based on the first configuration information to realize positioning. Therefore, when the cell in which the terminal device resides changes, the terminal device is not required to establish a connection with the network device, or is not required to perform signaling interaction with the network device to obtain configuration information of the first signal, thereby reducing signaling and power consumption overhead. In addition, since multi-cell joint configuration can be implemented based on the first configuration information, there is no need to monitor a configuration of each of first signals of a plurality of cells concurrently by the network device, thereby simplifying the communication flow and improving the communication efficiency.

In some embodiments, the first configuration information may be determined by an access network device corresponding to a cell in which the terminal device currently resides. In other embodiments, the first configuration information may be determined by a core network device. In other words, the core network device may configure the first signal of the terminal device in the first region. As an example, if the first configuration information is used for configuring a transmission resource of the first signal, the core network device may allocate respective resources for transmitting a corresponding first signal to each of terminal devices in the first region, thereby avoiding resource conflict caused by using the same resources for different first signals in the first region.

The following describes the first configuration information being determined by the core network device as an example, and the method illustrated in FIG. 2 may further include operations at S202. As shown in FIG. 2, the method shown in FIG. 2 may also be implemented by a core network device. The core network device may include a location server (e.g., LMF).

At S202, the core network device determines the first configuration information.

Since the first region includes the plurality of cells, determining the first configuration information through the core network device can realize coordination of the configuration information of the plurality of cells, thereby avoiding collision and configuration abnormality. For example, as described above, the first configuration information may be used to configure a transmission resource(s) of the first signal. Therefore, the core network device may determine the transmission resource of the first signal and determine the first configuration information, such that it is possible to realize reasonable scheduling of resources in the first region by the core network device, thereby avoiding resource conflict in the first region.

After the core network device determines the first configuration information, operations at S204 may be executed. At S204, the core network device transmits the first configuration information to the access network device. The access network device receives the first configuration information.

Hereinafter, with reference to FIG. 3, the above-described embodiment will be described in detail by taking an SRS for positioning as an example of the first signal.

The method illustrated in FIG. 3 may be implemented by a terminal device, a first access network device, a second access network device, and a core network device. The method shown in FIG. 3 may include operations at S310 to S360.

At S310, the first access network device transmits first configuration information to the terminal device.

A cell corresponding to the first access network device may be a serving cell of the terminal device. That is, based on operations at S310, a network device corresponding to the serving cell may transmit the first configuration information to the terminal device. The first configuration information may include information of the first region and configuration information of the SRS.

At S320, the core network device transmits a measurement request to an access network device that is expected to receive the SRS. The measurement request may be transmitted through an NRPPa message.

For example, the access network device that is expected to receive the SRS includes the first access network device and the second access network device, and the operations at S320 may include operations at S321 and operations at S322. The second access network device may be an adjacent access network device, that is, the second access network device may be an access network device corresponding to an adjacent cell.

At S321, the core network device transmits a measurement request to the first access network device. At S322, the core network device transmits a measurement request to the second access network device.

It shall be noted that FIG. 3 is merely an example, and the access network device that is expected to receive the SRS may not include the second access network device, or may include other access network devices.

At S330, based on the first configuration information, the terminal device transmits an SRS, and the access network device receives the SRS to realize positioning.

If the access network device that is expected to receive the SRS includes the first access network device and the second access network device, operations at S330 may include operations at S331 to S334.

At S331, the terminal device transmits the SRS to the first access network device.

At S332, the terminal device transmits the SRS to the second access network device.

At S333, the first access network device determines a measurement result based on the received SRS, and transmits the measurement result to the core network device.

At S334, the second access network device determines a measurement result based on the received SRS, and transmits the measurement result to the core network device.

At S340, the terminal device undergoes cell reselection. After the reselection, the terminal device resides in a cell corresponding to the second access network device, where the cell corresponding to the second access network is located in the first region.

At S350, the core network device transmits a measurement request to an access network device that is expected to receive an SRS. The measurement request may be transmitted through an NRPPa message.

The access network device that is expected to receive the SRS in operations at S350 may be different from that in operations at S320. This may be because the location of the terminal device has changed, so the cell is expected to receive the SRS may also change, and thus, the access network device corresponding to the cell may also change.

The operations at S350 may include operations at S351. At S351, the core network device transmits a measurement request to the second access network device. It shall be noted that the operations at S350 may include other operations, that is, the core network device may transmit a measurement request to another access network device.

At S360, based on the first configuration information, the terminal device transmits an SRS, and the access network device (including, for example, an access network device corresponding to the serving cell and an access network device corresponding to the neighboring cell) receives the SRS to realize positioning.

In the case where the access network device that is expected to receive the SRS includes the second access network device, operations at S360 may include operations at S361 and S362.

At S361, the terminal device transmits the SRS to the second access network device.

At S362, the second access network device determines a measurement result based on the received SRS, and transmits the measurement result to the core network device.

It is to be noted that there is another access network device for receiving the SRS, that is, a receiving terminal for receiving the SRS may include another access network device other than the second access network device. For example, the first access network device may also receive the SRS and performs measurement on the SRS. Which access network devices receive the SRS may be determined based on a recipient of the measurement request transmitted by the core network device in operations at S350.

In some embodiments, the method shown in FIG. 3 may further include operations at S302. At S302, the first access network device determines the first configuration information. Since the first access network device is an access network device corresponding to the serving cell, in operations at S302, the first configuration information is determined by the serving cell.

It is to be noted that the above-described operations performed by the first access network device or the second access network device may also be performed by the core network device. Specifically, the core network device may include a location server. For example, the operations at S302 may be performed by the core network device. In some implementations, the operations at S302 may be performed by the location server.

In some embodiments, the plurality of cells in the first region may include a first cell and a second cell. When the terminal device resides in the first cell or the second cell, the information for configuring the first signal may be the same. For example, during UL positioning, if the terminal device moves from the first cell to the second cell after cell reselection, the terminal device may continue to use the information for configuring the first signal when the terminal device is in the first cell to transmit the first signal, that is, continue to multiplex the information for configuring the first signal before the reselection.

It is to be noted that the first cell and the second cell may be intra-frequency cells or inter-frequency cells, which is not limited in the present disclosure.

It shall be understood that although the cell in which the terminal device resides has changed, a relative positional relationship between the terminal device and the network is still within a range. Therefore, the configuration information of the first signal before cell reselection may still be applicable in the cell after the reselection. In this case, the information for configuring the first signal may not change. Taking the embodiment shown in FIG. 3 as an example, the terminal device may continue to configure the first signal in operations at S360 based on the information for configuring the first signal in operations at S330, thereby realizing transmission of the first signal at S360.

Therefore, when cell reselection occurs at the terminal device, the terminal device may not release the information for configuring the first signal before cell reselection. As described above, the information for configuring the first signal after the cell reselection may be the same as the information for configuring the first signal before cell reselection. Therefore, the terminal device may continue to transmit the first signal based on the information for configuring the first signal before the cell reselection. It shall be understood that this method provided in embodiments of the disclosure can reduce the processing steps of the terminal device, and thus can further reduce the energy consumption.

In some embodiments, when cell reselection occurs, the terminal device may release the information for configuring the first signal before cell reselection. When the terminal device resides in a new cell, the terminal device may redetermine information for configuring the first signal based on the first configuration information. Alternatively, the redetermined information for configuring the first signal may be the same as that before reselection. In this manner, the processing flow of the terminal device is similar to the processing flow of the related technologies, so that the terminal device of the present disclosure has small modification, and can be compatible with the first signal configuration method of the related technologies. It shall be understood that although after cell reselection, the terminal device releases the information for configuring the first signal before cell reselection, the terminal device does not need to apply to the network for obtaining new configuration information, and may determine the new information for configuring the first signal through the first configuration information. Therefore, this method can still reduce the overhead of signaling and power consumption to a certain extent.

As described above, all the plurality of cells in the first region may employ the same information for configuring the first signal. Considering that terminal devices move between cells, when different terminal devices in different cells are configured with the same information for configuring the first signals, the terminal devices using the same configuration/information for the first signals may be considered to be in a same cell, thereby causing serious interference to access network devices that measure the first signals. Even if the terminal devices using the same configuration for the first signals are in different cells, the access network device performing measurement of the first signal may report a measurement value and identification of the detected first signal to the location server. The location server does not know which measured values belong to the same user during parsing, so that the parsing/solving has a large error. In particular, the closer the distance of users using the same configuration for the first signals is, the more difficult it is to overcome the problem of the parsed/solved error. The present disclosure proposes to solve the above-described problem by first indication information. The first indication information may be configured to indicate that a previous configuration for the first signal can be continued to be used when the terminal device resides in which cell. This technical solution will be described in detail below.

In some embodiments, the terminal device may receive the first indication information. The access network device may transmit the first indication information. The first indication information may be configured to indicate whether information for configuring the first signal is the same or different when the terminal device resides in the first cell or the second cell. As an implementation, the first indication information may be configured to indicate whether the terminal device, when residing in the second cell, may continue to use information for configuring the first signal when the terminal device previously resided in the first cell. If the first indication information indicates that the information previously for configuring the first signal may be used when the terminal device resides in the second cell, the terminal device may multiplex the information previously for configuring the first signal when the terminal device moves to the second cell after cell reselection. If the first indication information indicates that the information previously for configuring the first signal could not be used when the terminal device resides in the second cell, the terminal device may not multiplex the information previously for configuring the first signal when the terminal device moves to the second cell after cell reselection. In this case, for example, the terminal device may determine new information for configuring the first signal according to the ID of the second cell and/or the first configuration information.

For a cell in which the first indication information indicates that the information previously for configuring the first signal could not be used, if the terminal device resides in the cell, the new information for configuring the first signal may be the same as the information previously for configuring the first signal, thereby realizing reuse of the configuration in the first region, and thus improving the resource utilization rate of the first signal.

The following describes an SRS-Pos as an example of the first signal to illustrate the technical solutions of the disclosure. When the terminal device moves from serving cell 1 to neighboring cell A or neighboring cell B after cell reselection, whether configuration of an original SRS-Pos is reused can be configured by the access network device corresponding to the serving cell through the first indication information. The first indication information may indicate, for example, the configuration of the original SRS-Pos is multiplexed if the terminal device moves to the cell A after the cell reselection. If the terminal device moves to the cell B after the cell reselection, transmission of the SRS is performed according to configuration of the SRS-Pos of the cell B.

It shall be understood that, for some neighboring cells (such as neighboring cell A), if the terminal device resides in the neighboring cell A, the information previously for configuring the first signal may be continuously multiplexed to configure the first signal. For some neighboring cells (such as neighboring cell B), if the terminal device resides in the neighboring cell B, the information previously for configuring the first signal may not be multiplexed for configuring the first signal, which can realize the configuration isolation of the first signal. That is, the information previously for configuring the first signal is valid in the cell A and the serving cell, and is not introduced in the cell B.

Hereinafter, information included in the first configuration information will be described in detail. The first configuration information may include, for example, information common to the plurality of cells in the first region and/or exclusive information specific to a first cell.

The information common to the plurality of cells may be shared by the plurality of cells, that is, each of the plurality of cells may determine information for configuring the first signal based on the information common to the plurality of cells (common information). That is, the information common to the plurality of cells may be applied to the plurality of cells. For example, the common information may include parameters that are common across cells. The common information may include, for example, some configuration parameters related to configuration of the first signal. For example, the common information may include a time-frequency resource configuration, a sequence ID of the first signal, a periodicity, an offset amount, a comb type, a resource type, and the like. If resources are reserved for cells within the first region according to parameters that are common across cells, there may be no impact on the system. As one implementation, the common information may include some parameters in the parameter "SRS-Config".

The exclusive information specific to the first cell may be specific to the first cell. That is, when the terminal device resides in the first cell, the information for configuring the first signal may include the exclusive information specific to the first cell. In other words, when the terminal device resides in a cell other than the first cell, the information for configuring the first signal could not include information specific to the first cell. As one implementation, the exclusive information specific to the first cell may include some parameters in the parameter "SRS-Config".

The exclusive information may be related to one or more pieces of the following information: a time for transmitting the first signal, a frequency at which the first signal is transmitted, and a positional relationship between the terminal device and the access network device. For example, the exclusive information may include one or more of the following: the number of periodic transmissions, a resource type, a bandwidth, and first information of a resource set list (SRS resource set list). The first information of the resource set list includes one or more of following information: the number of SRS resources of a first signal corresponding to a first resource set (number of SRS resources per set), a periodicity, a carrier frequency (SRS frequency) of the first signal, a spatial relation information, and pathloss reference information.

In order to distinguish the exclusive information of different cells, the exclusive information may include a cell identification of a corresponding cell. For example, the exclusive information of the first cell may include an identification of the first cell. In some embodiments, the exclusive information may include a cell identification and one or more pieces of following information: the number of periodic transmissions, a resource type, a bandwidth, an SRS resource set list (e.g., including the number of SRS resources per set, a periodicity, and an SRS frequency).

In some embodiments, the exclusive information may include an identification of a cell group. The cell group may include some of or all the plurality of cells in the first region, i.e., include at least one cell of the plurality of cells in the first region. The identification information of the first cell may be included in the identification, of the cell group, in the exclusive information of the first cell. That is, the exclusive information may be specific to a set of cells (the cell group). When the terminal device resides in any cell in the cell group, the information for configuring the first signal may include the exclusive information. When the terminal device resides in a cell other than the at least one cell in the cell group, the information for configuring the first signal may not include the exclusive information.

When the information for configuring the first signal is used to configure the resource occupied by the first signal, for the resource occupied by the first signal, other cells in the first region that do not allocate the resource of the first signal to the terminal device and use these resources cannot perform transmission of other data or control channels. Otherwise, when the terminal device to be located moves to the vicinity, large interference may be caused, which may make the resource of the first signal exclusive within a certain range, thereby increasing the consumption of the resource.

In view of the above problems, in the present disclosure, the first configuration information may be used to indicate a plurality of pieces of candidate configuration information. Each of the plurality of pieces of candidate configuration information is used to configure the first signal. The terminal device may select one or more pieces of candidate configuration information from among the plurality of pieces of candidate configuration information to configure the first signal. In a case where the first configuration information is used to configure the resources of the first signal, the plurality of pieces of candidate configuration information may be used to indicate the plurality of candidate resources, that is, to indicate a candidate resource pool. The terminal device may select a resource for transmitting the first signal from the candidate resource pool indicated by the first configuration information. The terminal device may also perform frequency hopping on the selected resource. Based on the above scheme, resource multiplexing can be realized and interference can be reduced.

In some embodiments, in a case where cell reselection occurs at the terminal device in the first region, the access network device may transmit second indication information to a core network device. The second indication information is used to indicate a cell in which the terminal device resides after cell reselection occurs. That is, when the cell reselection occurs at the terminal device, the second indication information may notify the core network device of information of a new cell after the cell reselection.

After the cell reselection occurs, the information for configuring the first signal may be changed. Therefore, through the second indication information, the core network device can know the configuration of the first signal, thereby notifying the neighboring cell, and further measuring a newly configured first signal.

It shall be understood that if the terminal device notifies the core network device of the information of the new cell in which the terminal device resides, the terminal device needs to enter a connected state, which may consume the power of the terminal device. Therefore, by notifying the location server of the information of the new cell by the access network device, power consumption of the terminal device can be avoided.

In some embodiments, a cell in which the terminal device resides before the cell reselection occurs is a third cell, a cell in which the terminal device resides after the cell reselection occurs is a fourth cell, and the access network device is an access network device corresponding to the third cell or the fourth cell. That is, the access network device corresponding to an original cell before the cell reselection may transmit the second indication information, and/or the access network device corresponding to the new cell after the cell reselection may transmit the second indication information. If the access network device corresponding to the original cell transmits the second indication information, the core network device may earlier know the new cell that the terminal device reselects, determine the information for configuring the first signal used by the terminal device according to the new cell, and notify the cell that needs to perform measurement of the first signal to perform the measurement.

There is no restriction on the method in which the access network device determines the second indication information (i.e., the new cell after residence). For example, the second indication information may be determined based on one or more pieces of the following information of the first signal: a timing advance (TA) estimation result, a sequence, and a time-frequency position.

In some embodiments, the second indication information may be determined based on a positioning situation.

For example, the terminal device may transmit the first signal using a new configuration. The access network device may detect the newly configured first signal, but cannot detect the previously configured first signal. The access network device may report the information to the core network device, and the core network device may determine that the terminal device has undergone the cell reselection.

As another example, the terminal device may transmit the first signal using the new configuration. According to the notification of the access network receiving the first signal, the core network device may determine the location of the terminal device, thereby determining the cell in which the terminal device resides.

In some embodiments, the access network device may perform blind detection on all signals. The blind detection may include detecting the previously configured first signal and the newly configured first signal. Based on a result of the blind detection, the access network device can perform positioning measurement and report a measurement result obtained by measuring to the location server. The measurement result may include, for example, a first signal configuration and a measurement value. The first signal configuration and the measurement value may include, for example, a sequence of the first signal and a time-frequency position. The location server associates the measurement result with the user ID, and performs position calculation. According to the location of the terminal device, it is possible to determine the cell in which the terminal device resides. The blind detection can be realized as follows. A time-frequency sequence of the first signal before reselection (for example, when the terminal device resides in the first cell) is defined as $s_1$, a time-frequency sequence of the first signal after reselection (for example, when the terminal device resides in the second cell) is defined as $s_2$, both $s_1$ and $s_2$ are determined based on the configuration information, and a sequence of the first signal actually received by the access network device is defined as r. When the following formula $$s_2 \odot r > s_1 \odot r$$

is satisfied, it can be considered that the terminal device switches to the cell after reselection. That is, it can be determined that the second cell is the cell in which the terminal device resides after the reselection. In the above formula,

denotes the inner product.

In some embodiments, the second indication information may be determined based on the TA estimation. For example, the terminal device may transmit the first signal using an original configuration. The access network device corresponding to a new serving cell may perform the TA estimation using the received first signal. According to a result of the TA estimation (TA estimation result), the access network device may determine whether the terminal device is within a coverage range of the access network device.

The terminal device with low energy consumption does not obtain a TA value of a new cell after reselection by performing a random-access procedure. Therefore, both the cells before and after reselection cannot determine the cell in which the terminal device resides. However, based on the above method, the access network device can determine the cell in which the terminal device resides, and thus can further inform the core network device of information of the cell in which the terminal device resides.

When the information for configuring the first signal indicated by the first configuration information has been occupied, the core network device may notify the access network device of this situation. For example, the access network device may receive third indication information transmitted by the core network device. The third indication information may be used to indicate information that has been used to configure the first signal, which may prevent the access network device from using the configuration information and avoid the collision of the configuration information. When the first signal is configured by the access network device (e.g., a serving cell), other cells do not know that the configuration (such as a configured resource) has been used, and in this case, the access network device (e.g., the serving cell) notifies the core network device of the configuration information that has been used for configuring. Furthermore, the core network device may notify the cells sharing the resource of the configuration information that has been used for configuring. When each of the cells configures the first signal, the cells may avoid using the information that has been allocated for configuring the first signal as much as possible, thereby reducing collision.

It is to be noted that the terminal device and/or the access network device may transmit to the core network device one or more pieces of the following information: information of a cell in which the terminal device currently resides, an identification (ID) of the terminal device, and information of a first region.

It shall be noted that there is no restriction on a state of the terminal device, i.e., the terminal device of the present disclosure may not necessarily be in the RRC state. For example, the method provided in embodiments of the present disclosure may be performed by a terminal device in an RRC_INACTIVE state or in an RRC_IDLE state.

It shall be noted that, for UL positioning, in any case, the core network device (for example, the LMF) may request the TRP of the neighboring cell to receive the first signal transmitted by the terminal device.

The embodiments related to the method of the present disclosure are described in detail above, and embodiments related to the apparatus of the present disclosure are described in detail below. It shall be understood that the description of the embodiments related to the method and the description of the embodiments related to the apparatus correspond to each other. Therefore, for the portions not described in the embodiments related to the apparatus in detail, reference may be can be referred to the foregoing method embodiments.

FIG. 4 is a schematic structural diagram of a terminal device 400 according to an embodiment of the present disclosure. The terminal device 400 includes a first receiving unit 410.

The first receiving unit 410 is configured to receive first configuration information. The first configuration information is related to a first region and a first signal, the first signal is used for positioning, and the first region includes a plurality of cells. When the terminal device resides in any cell in the first region, the first configuration information is used to indicate information for configuring the first signal.

In some embodiments, the plurality of cells include a first cell and a second cell. When the terminal device resides in the first cell or the second cell, the information for configuring the first signal is the same.

In some embodiments, the plurality of cells include a first cell and a second cell, and the terminal device further includes: a second receiving unit configured to receive first indication information. The first indication information is used to indicate whether the information for configuring the first signal is the same when the terminal device resides in the first cell or the second cell.

In some embodiments, the first configuration information includes information common to the plurality of cells.

In some embodiments, the plurality of cells include a first cell, and the first configuration information includes exclusive information specific to the first cell.

In some embodiments, the exclusive information includes identification information of the first cell.

In some embodiments, the identification information of the first cell is included in an identification of a cell group, and the cell group includes some of or all the plurality of cells. The exclusive information includes the identification of the cell group, and the exclusive information is exclusive to some of or all the cells.

In some embodiments, the exclusive information is related to one or more pieces of the following information: a time for transmitting the first signal, a frequency at which the first signal is transmitted, and a positional relationship between the terminal device and the access network device.

In some embodiments, the first configuration information is determined by a core network device.

In some embodiments, the core network device includes a location server.

In some embodiments, the first configuration information is used to indicate a plurality of pieces of candidate configuration information, and each of the plurality of pieces of candidate configuration information is used to configure the first signal.

In some embodiments, the terminal device further includes a selecting unit configured to select one piece of candidate configuration information of the plurality of pieces of candidate configuration information as information for configuring the first signal.

In some embodiments, the first signal is an SRS for positioning.

In some embodiments, the first configuration information is used to configure a transmission resource(s) of the first signal.

Figure 5:
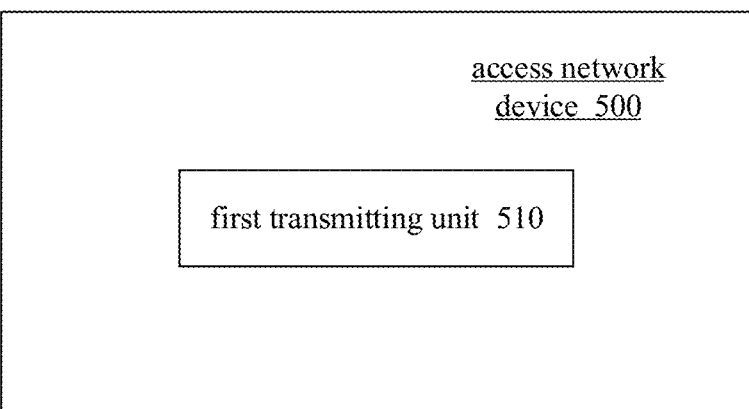
FIG. 5 is a schematic structural diagram of an access network device according to an embodiment of the present disclosure.

FIG. 5 is a schematic structural diagram of an access network device 500 according to an embodiment of the present disclosure. The access network device 500 includes a first transmitting unit 510.

The first transmitting unit 510 is configured to transmit the first configuration information to the terminal device. The first configuration information is related to a first region and a first signal, the first signal is configured for positioning, and the first region includes a plurality of cells. When the terminal device resides in any cell in the first region, the first configuration information is used to indicate information for configuring the first signal.

In some embodiments, the plurality of cells include a first cell and a second cell. When the terminal device resides in the first cell or the second cell, the information for configuring the first signal is the same.

In some embodiments, the plurality of cells include a first cell and a second cell, and the access network device further includes: a second transmitting unit configured to transmit first indication information to the terminal device. The first indication information is used to indicate whether the information for configuring the first signal is the same when the terminal device resides in the first cell or the second cell.

In some embodiments, the first configuration information includes information common to the plurality of cells.

In some embodiments, the plurality of cells include a first cell, and the first configuration information includes exclusive information specific to the first cell.

In some embodiments, the exclusive information includes identification information of the first cell.

In some embodiments, the identification information of the first cell is included in an identification of a cell group, the cell group includes some of or all the plurality of cells. The exclusive information includes the identification of the cell group, and the exclusive information is exclusive to the some of or all the cells.

In some embodiments, the exclusive information is related to one or more pieces of the following information: a time for transmitting the first signal, a frequency at which the first signal is transmitted, and a positional relationship between the terminal device and the access network device.

In some embodiments, the first configuration information is used to indicate a plurality of pieces of candidate configuration information, and each of the plurality of pieces of candidate configuration information can be used to configure the first signal.

In some embodiments, the first configuration information is determined by a core network device.

In some embodiments, the access network device further includes: a third transmitting unit configured to transmit second indication information to the core network device in a case where cell reselection occurs at the terminal device in the first region. The second indication information is used to indicate a cell in which the terminal device resides after the cell reselection occurs.

In some embodiments, the second indication information is determined based on following information of the first signal: a timing advance (TA) estimation result, a sequence, and a time-frequency position.

In some embodiments, the plurality of cells include a first cell and a second cell, the first cell is a cell in which the terminal device resides before reselection. In the first cell, a time-frequency sequence of the first signal is defined as $s_1$. In the second cell, a time-frequency sequence of the first signal is defined as $s_2$. Both $s_1$ and $s_2$ are determined based on configuration information, a sequence of the first signal received by the access network device is defined as r, and the second cell is regarded as a cell in which the terminal device resides after reselection when $$s_2 \odot r > s_1 \odot r$$

is satisfied.

In some embodiments, a cell in which the terminal device resides before cell reselection occurs is a third cell, and a cell in which the terminal device resides after the cell reselection occurs is a fourth cell. The access network device is an access network device corresponding to the third cell or the fourth cell.

In some embodiments, the core network device includes a location server.

In some embodiments, the access network device further includes: a fourth receiving unit configured to receive third indication information. The third indication information is used to indicate information that has been used to configure the first signal.

In some embodiments, the first signal is a sounding reference signal (SRS) for positioning.

In some embodiments, the first configuration information is used to configure a transmission resource of the first signal.

Figure 6:
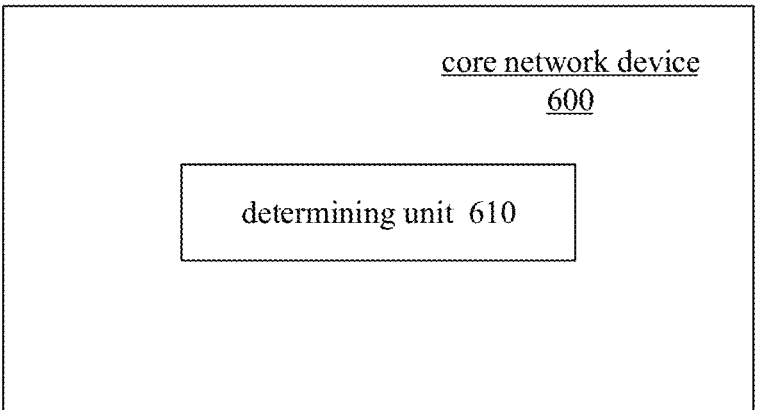
FIG. 6 is a schematic structural diagram of a core network device according to an embodiment of the present disclosure.

FIG. 6 is a schematic structural diagram of a core network device 600 according to an embodiment of the present disclosure. The core network device 600 may include a determining unit 610.

The determining unit 610 is configured to determine first configuration information of the terminal device. The first configuration information is related to a first region and a first signal, the first signal is configured for positioning, and the first region includes a plurality of cells. When the terminal device resides in any cell in the first region, the first configuration information is used to indicate information for configuring the first signal.

In some embodiments, the plurality of cells include a first cell and a second cell. When the terminal device resides in the first cell or the second cell, the information for configuring the first signal is the same.

In some embodiments, the first configuration information includes information common to the plurality of cells.

In some embodiments, the plurality of cells include a first cell, and the first configuration information includes exclusive information specific to the first cell.

In some embodiments, the exclusive information includes identification information of the first cell.

In some embodiments, the identification information of the first cell is included in an identification of a cell group, the cell group includes some of or all the plurality of cells. The exclusive information includes the identification of the cell group, and the exclusive information is exclusive to some of or all the cells.

In some embodiments, the exclusive information is related to one or more pieces of the following information: a time for transmitting the first signal, a frequency at which the first signal is transmitted, and a positional relationship between the terminal device and an access network device.

In some embodiments, the first configuration information is used to indicate a plurality of pieces of candidate configuration information, and each of the plurality of pieces of candidate configuration information can be used to configure the first signal.

In some embodiments, the core network device further includes a third receiving unit. The third receiving unit is configured to receive second indication information transmitted by the access network device in a case where cell reselection occurs at the terminal device in the first region. The second indication information is used to indicate a cell in which the terminal device resides after cell reselection occurs.

In some embodiments, the second indication information is determined based on the following information of the first signal: a TA estimation result, a sequence, a time-frequency position.

In some embodiments, the plurality of cells include a first cell and a second cell, and the first cell is a cell in which the terminal device resides before reselection. In the first cell, a time-frequency sequence of the first signal is defined as $s_1$. In the second cell, a time-frequency sequence of the first signal is defined as $s_2$. Both $s_1$ and $s_2$ are determined based on configuration information, a sequence of the first signal received by the access network device is defined as r, and the second cell is regarded as a cell in which the terminal device resides after reselection when

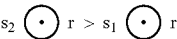

$$s_2 \bigodot r > s_1 \bigodot r$$

is satisfied.

In some embodiments, a cell in which the terminal device resides before cell reselection occurs is a third cell, a cell in which the terminal device resides after the cell reselection occurs is a fourth cell, and the access network device is an access network device corresponding to the third cell or the fourth cell.

In some embodiments, the core network device further includes a fourth transmitting unit configured to transmit third indication information to the access network device. The third indication information is used to indicate information that has been used to configure the first signal.

In some embodiments, the first signal is a sounding reference signal (SRS) for positioning.

In some embodiments, the first configuration information is used to configure a transmission resource of the first signal.

In some embodiments, the core network device includes a location server.

In an alternative embodiment, the first receiving unit 410 or the second transmitting unit 510 may be a transceiver 730, and the determining unit 610 may be a processor 710. The terminal device 400, the access network device 500, or the core network device 600 may further include a memory 720, as specifically shown in FIG. 7.

Figure 7:
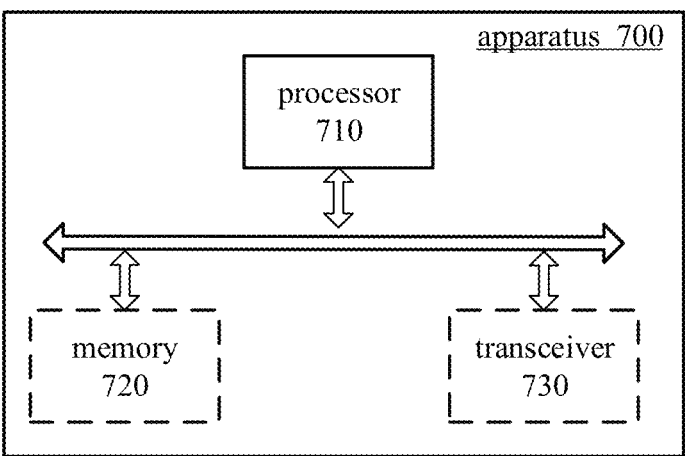
FIG. 7 is a schematic structural diagram of an apparatus for communication according to an embodiment of the present disclosure.

FIG. 7 is a schematic configuration diagram of an apparatus for communication according to an embodiment of the present disclosure. The dashed line in FIG. 7 indicates that the unit or module is optional. The apparatus 700 may be used to implement the method described in the method in the embodiments described above. The apparatus 700 may be a chip, a terminal device, or a network device.

The apparatus 700 may include one or more processors 710. The processor 710 may support the apparatus 700 to implement the methods described in the above method embodiments. The processor 710 may be a general-purpose processor or a special-purpose processor. For example, the processor may be a central processing unit (CPU). Alternatively, the processor may also be another general-purpose processor, a digital signal processor (DSP), an application specific integrated circuit (ASIC), a field programmable gate array (FPGA) or other programmable logic device, a discrete gate, or transistor logic device, a discrete hardware component, or the like. The general-purpose processor may be a microprocessor or the processor may be any conventional processor or the like.

The apparatus 700 may further include one or more memories 720. The memory 720 has stored a program that can be executed by the processor 710 to cause the processor 710 to perform the method described in the previous method embodiments. The memory 720 may be independent of the processor 710 or may be integrated in the processor 710.

The apparatus 700 may further include a transceiver 730. The processor 710 may communicate with other devices or chips through the transceiver 730. For example, the processor 710 may transmit and receive data with other devices or chips through the transceiver 730.

The embodiment of the present disclosure further provides a computer-readable storage medium for storing a program. The computer-readable storage medium can be applied to the terminal device, the access network device, or the core network device provided in the embodiment of the present disclosure, and the program causes the computer to execute the method executed by the terminal device, the access network device, or the core network device in the embodiments of the present disclosure.

Embodiments of the present disclosure further provide a computer program product. The computer program product includes a program. The computer program product can be applied to a terminal device, an access network device, or a core network device provided by an embodiment of the present disclosure, and the program causes a computer to execute a method executed by the terminal device, the access network device, or the core network device in the embodiments of the present disclosure.

Embodiments of the present disclosure also provide a computer program. The computer program can be applied to the terminal device, the access network device, or the core network device provided in the embodiments of the present disclosure, and the computer program causes the computer to execute the method executed by the terminal device, the access network device, or the core network device in the embodiments of the present disclosure.

It is to be understood that the terms "system" and "network" may be used interchangeably in this application. In addition, the terminology used in the present disclosure is for the purpose of explanation of specific embodiments of the present disclosure only, and is not intended to limit the present disclosure. The terms "first," "second," "third," and "fourth," etc. in the specification and claims of the present disclosure and the accompanying drawings are used to distinguish different objects, and are not used to describe a specific order. Furthermore, the terms "comprising/including" and "having", as well as any variations thereof, are intended to cover non-exclusive inclusions.

In the embodiments of the present disclosure, the "indication/instruction" mentioned may be a direct indication, an indirect indication, or an associated relationship. For example, A indicates B, which may mean that A directly indicates B, for example, B can be acquired by A; or may also mean that A indicates B indirectly, for example A indicates C, and B can be acquired through C; or may also indicate that there is an association relationship between A and B.

In an embodiment of the present disclosure, "B corresponding to A" means that B is associated with A, and B can be determined according to A. However, it shall also be understood that determining B according to A does not mean that B is determined according to A alone, and that B may also be determined according to A and/or other information.

In the embodiments of the present disclosure, the term "correspondence/corresponding" may indicate that there is a direct correspondence or indirect correspondence relationship between the two, may indicate that there is a correlation relationship between the two, or may indicate a relationship between indicating and being instructed, configuring and being configured, or the like.

In the embodiment of the present disclosure, "predefined" or "preconfigured" may be realized by storing corresponding codes, tables, or other methods that can be used to indicate relevant information in advance in devices (including, for example, terminal devices and network devices), and the present disclosure does not limit specific implementations thereof. For example, predefined may refer to defined in the protocol.

In the embodiment of the present disclosure, the "protocol" may refer to a standard protocol in the communication field, and may include, for example, an LTE protocol, an NR protocol, and related protocols applied to future communication systems, and the present disclosure is not limited thereto.

The term "and/or" in the embodiment of the present disclosure is only an association relationship describing an association object, and indicates that there may be three kinds of relationships, for example, A and/or B, which may indicate that A exists alone, A and B exist concurrently, and B exists alone. In addition, the character "/" in this article generally indicates that the related objects before and after are in an "or" relationship.

In the embodiments of the present disclosure, the "comprising/including" may refer to directly including or indirectly including. Alternatively, the reference to "comprising/including" in the embodiments of the present disclosure may be replaced with "indicating" or "for determining". For example, A includes B, can be replaced with A to indicate B, or A is used to determine B.

In various embodiments of the present disclosure, the size of the sequence number of the above-described processes does not mean the sequence of execution, and the sequence of execution of each process should be determined by its function and internal logic, and should not constitute any limitation on the implementation process of the embodiments of the present disclosure.

In several embodiments provided herein, it shall be understood that the disclosed systems, apparatuses, and methods may be implemented in other ways. For example, the device embodiments described above are merely schematic, for example, the division of units is only one logical function division, and there may be other division methods in actual implementation, for example, multiple units or components may be combined or integrated into another system, or some features may be ignored or not implemented. In addition, the coupling or direct coupling or communication connection between each other shown or discussed may be an indirect coupling or communication connection through some interface, device or unit, which may be electrical, mechanical or otherwise.

The units described as separate units may or may not be physically separate, and the units displayed as units may or may not be physical units, that is, they may be located at one place or may be distributed over a plurality of network units. Some or all of the units may be selected according to actual needs to achieve the purpose of the solution of the present embodiment.

In addition, each functional unit in each embodiment of the present disclosure may be integrated in one processing unit, each unit may be physically present alone, or two or more units may be integrated in one unit.

In the embodiments described above, it may be implemented in whole or in part by software, hardware, firmware, or any combination thereof. When implemented using software, it may be implemented in whole or in part in the form of a computer program product. The computer program product includes one or more computer instructions. When the computer program instructions are loaded and executed on a computer, the processes or functions described in accordance with embodiments of the present disclosure are generated in whole or in part. The computer may be a general-purpose computer, a special purpose computer, a computer network, or other programmable device. The computer instructions may be stored in a computer-readable storage medium or transferred from one computer-readable storage medium to another computer-readable storage medium, The computer instructions may be transmitted from one website site, computer, server or data center to another website site, computer, server or data center by wired (e.g. coaxial cable, fiber optic, digital subscriber line (DSL)) or wireless (e.g. infrared, wireless, microwave, etc.) means. The computer-readable storage medium may be any available medium that can be read by a computer or a data storage device such as a server, a data center, or the like that incorporates one or more available media integrations. The available medium may be a magnetic medium (e.g., a floppy disk, a hard disk, a magnetic tape), an optical medium (e.g., a digital video disc (DVD)), or a semiconductor medium (e.g., a solid-state disk (SSD)), or the like.

The above is merely a specific embodiment of the present disclosure, but the scope of protection of the present disclosure is not limited thereto, and any person skilled in the art can easily think of changes or substitutions within the technical scope disclosed in the present disclosure, and should be covered within the scope of protection of the present disclosure. Therefore, the scope of protection of the present disclosure should be based on the scope of protection of the claims.

What is claimed is:

1. A communication method, comprising:
receiving, by a terminal device, first configuration information;
wherein the first configuration information configures a sounding reference signal for positioning (SRS-Pos) in a first region that includes a plurality of cells; and
wherein the first configuration information comprises at least one common SRS-Pos parameter that is shared by each cell of the plurality of cells in the first region, and wherein the first configuration information indicates a plurality of pieces of candidate configuration information that form a candidate resource pool; and
selecting, by the terminal device, one piece of candidate configuration information from the plurality of pieces of candidate configuration information as information for configuring the SRS-Pos.

2. The method of claim 1, wherein the plurality of cells include a first cell and a second cell, and the method further comprises:
receiving, by the terminal device, first indication information;
wherein the first indication information indicates whether information for configuring the SRS-Pos is the same in response to the terminal device being resided in the first cell or the second cell.

3. The method of claim 1, wherein the plurality of cells include a first cell, and the first configuration information includes information specific to the first cell.

4. The method of claim 3, wherein the information specific to the first cell includes identification information of the first cell.

5. The method of claim 4, wherein the identification information of the first cell is included in an identification of a cell group, and the cell group includes at least one cell of the plurality of cells, wherein the information specific to the first cell includes the identification of the cell group, and the information specific to the first cell is specific to the at least one cell of the plurality of cells.

6. The method of claim 4, wherein the information specific to the first cell is related to one or more pieces of following information: a time for transmitting the SRS-Pos, a frequency at which the SRS-Pos is transmitted, or a positional relationship between the terminal device and an access network device.

7. The method of claim 1, wherein the first configuration information is determined by a core network device.

8. The method of claim 7, wherein the core network device comprises a location server.

9. The method of claim 1, wherein the first configuration information configures a transmission resource of the SRS-Pos.

10. The method of claim 1, wherein the at least one common SRS-Pos parameter comprises at least one of the following: a time-frequency resource configuration of the SRS-Pos, a sequence identifier of the SRS-Pos, a periodicity of the SRS-Pos, an offset amount of the SRS-Pos, or a comb type of the SRS-Pos, or a resource type of the SRS-Pos.

11. A communication method, comprising:
transmitting, by an access network device, first configuration information to a terminal device;
wherein the first configuration information configures a sounding reference signal for positioning (SRS-Pos) in a first region that includes a plurality of cells; and
wherein the first configuration information comprises at least one common SRS-Pos parameter that is shared by each cell of the plurality of cells in the first region, and wherein the first configuration information indicates a plurality of pieces of candidate configuration information that form a candidate resource pool, and wherein one piece of candidate configuration information from the plurality of pieces of candidate configuration information is to be selected as information for configuring the SRS-Pos.

12. The method of claim 11, wherein the plurality of cells include a first cell and a second cell, the method further comprising:
transmitting, by the access network device, first indication information to the terminal device;
wherein the first indication information indicates whether information for configuring the SRS-Pos is the same in response to the terminal device being resided in the first cell or the second cell.

13. The method of claim 11, wherein the plurality of cells include a first cell, and the first configuration information includes information specific to the first cell.

14. The method of claim 13, wherein the information specific to the first cell includes identification information of the first cell.

15. An apparatus, comprising:
at least one processor; and
one or more non-transitory computer-readable storage media coupled to the at least one processor and storing programming instructions for execution by the at least one processor, wherein the programming instructions, when executed, cause the apparatus to perform operations comprising:
receiving first configuration information;
wherein the first configuration information configures a sounding reference signal for positioning (SRS-Pos) in a first region that includes a plurality of cells; and
wherein the first configuration information comprises at least one common SRS-Pos parameter that is shared by each cell of the plurality of cells in the first region, and wherein the first configuration information indicates a plurality of pieces of candidate configuration information that form a candidate resource pool; and selecting one piece of candidate configuration information from the plurality of pieces of candidate configuration information as information for configuring the SRS-Pos.

16. The apparatus of claim 15, wherein the plurality of cells include a first cell, and the first configuration information includes information specific to the first cell.

17. The apparatus of claim 16, wherein the information specific to the first cell includes identification information of the first cell.

18. The apparatus of claim 17, wherein the identification information of the first cell is included in an identification of a cell group, and the cell group includes at least one cell of the plurality of cells, wherein the information specific to the first cell includes the identification of the cell group, and the information specific to the first cell is specific to the at least one cell of the plurality of cells.

\* \* \* \* \*